US008509433B2

(12) United States Patent
Jung et al.

(10) Patent No.: US 8,509,433 B2
(45) Date of Patent: Aug. 13, 2013

(54) METHOD AND APPARATUS OF GENERATING ENCRYPTION KEY FOR BROADCAST ENCRYPTION

(75) Inventors: Bae Eun Jung, Yongin-si (KR); Maeng Hee Sung, Yongin-si (KR); Weon Il Jin, Yongin-si (KR); Hee Jean Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 900 days.

(21) Appl. No.: 11/727,308

(22) Filed: Mar. 26, 2007

(65) Prior Publication Data
US 2008/0086636 A1  Apr. 10, 2008

(30) Foreign Application Priority Data

Oct. 9, 2006 (KR) .................. 10-2006-0097830

(51) Int. Cl.
*H04L 9/00* (2006.01)

(52) U.S. Cl.
USPC .............................. 380/45; 380/278; 713/163

(58) Field of Classification Search
USPC ................................. 713/163; 380/45, 278
See application file for complete search history.

(56) References Cited

U.S. PATENT DOCUMENTS

| 6,684,331 | B1 * | 1/2004 | Srivastava ..................... 713/163 |
| 7,340,603 | B2 * | 3/2008 | Asano ........................... 713/163 |
| 2002/0147906 | A1 | 10/2002 | Lotspiech et al. |

FOREIGN PATENT DOCUMENTS

| JP | 2003-273862 | 9/2003 |
| KR | 10-2005-0078773 A | 8/2005 |
| KR | 10-2005-0087997 A | 9/2005 |
| KR | 10-2006-0049340 A | 5/2006 |

OTHER PUBLICATIONS

McGrew et al., "Key Establishment in large Dynamic Groups Using One Way Function Trees", Network Associates Inc., May 20, 1998, pp. 1-13.*

* cited by examiner

*Primary Examiner* — Eleni Shiferaw
*Assistant Examiner* — Paul Callahan
(74) *Attorney, Agent, or Firm* — NSIP Law

(57) ABSTRACT

A method and an apparatus are provided for generating an encryption key for broadcast encryption. The method of generating the encryption key for the broadcast encryption includes generating a first encryption key with respect to all nodes, configured in a plurality of depths, from a root node to a plurality of leaf nodes, and generating a second encryption key with respect to each intermediate node between the root node and the plurality of leaf nodes, wherein the generation of the second encryption key comprises generating any one of first and second keys using the first encryption key depending on whether a first child node, connected to a sibling node of the intermediate node, is on a left path or a right path of the intermediate node.

9 Claims, 5 Drawing Sheets

METHOD AND APPARATUS OF GENERATING ENCRYPTION KEY FOR BROADCAST ENCRYPTION

CROSS-REFERENCE TO RELATED APPLICATION

This application claims the benefit under 35 U.S.C. §119(a) of Korean Patent Application No. 10-2006-0097830, filed Oct. 9, 2006, in the Korean Intellectual Property Office, the entire disclosure of which is incorporated herein by reference.

BACKGROUND OF THE INVENTION

1. Field of the Invention

The present invention relates to a broadcast encryption algorithm. More particularly, the present invention relates to a method capable of effectively generating an encryption key for broadcast encryption, and an apparatus using the method.

2. Description of Related Art

Generally, a broadcast encryption algorithm is applied to environments having a large number of users, and environments where performing a handshake between a server and a terminal is difficult, such as an environment which broadcasts contents. The broadcast encryption algorithm is a method of transmitting information to only users desired by a sender, among all users. The method is effectively used only when a set of users, receiving the information, randomly and dynamically changes.

When the broadcast encryption algorithm is applied to a contents service, the broadcast encryption algorithm encrypts a contents key to transmit to all terminals, except for any terminal that has lost user authority, using an encryption key group which enables all terminals except for terminals that lost user authority to decrypt the contents key. The encryption key group is previously generated by a server and provided to the terminals. In this case, header information corresponds to data which has the encrypted contents key, encrypted with the encryption key group, which enables all of the terminals except for terminals that lost user authority to decrypt the contents key. The server simultaneously transmits information about the terminal that lost the header information and the user authority.

The broadcast encryption algorithm is generally configured in a tree structure. Examples of such algorithms include a complete subtree (CS), a subset difference (SD), a HBES algorithm, a CuBES algorithm and the algorithm suggested by T. Asano. With respect to the broadcast encryption algorithm, there have been great efforts to reduce transmission overhead, storage overhead, computation overhead, and so forth.

Accordingly, a need exists for a method and apparatus for efficiently and effectively generating an encryption key for broadcast encryption using minimal overhead.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and an apparatus which can effectively generate encryption keys for broadcast encryption since a first encryption key for each node, from a root node to a plurality of leaf nodes, is generated and a second encryption key for a child node, connected to a sibling node of an intermediate node, is generated using the generated first encryption key.

According to an aspect of exemplary embodiments of the present invention, a method is provided for generating an encryption key for broadcast encryption, the method comprising generating a first encryption key with respect to all nodes, configured in a plurality of depths, from a root node to a plurality of leaf nodes, and generating a second encryption key with respect to each intermediate node between the root node and the plurality of leaf nodes, wherein the generating of the second encryption key comprises generating any one of first and second keys using the first encryption key depending on whether a first child node, connected to a sibling node of the intermediate node, is on a left path or a right path of the intermediate node.

According to another aspect of exemplary embodiments of the present invention, an apparatus is provided for generating an encryption key for broadcast encryption, the apparatus comprising a first encryption key generator for generating a first encryption key with respect to all nodes, configured in a plurality of depths, from a root node to a plurality of leaf nodes, and a second encryption key generator for generating a second encryption key with respect to each intermediate node between the root node and the plurality of leaf nodes, wherein the second encryption key generator generates any one of first and second keys using the first encryption key depending on whether a first child node, connected to a sibling node of the intermediate node, is on a left path or a right path of the intermediate node.

Other objects, advantages, and salient features of the invention will become apparent to those skilled in the art from the following detailed description, which, taken in conjunction with the annexed drawings, discloses exemplary embodiments of the present invention.

BRIEF DESCRIPTION OF THE DRAWINGS

The above and other objects, features, and advantages of certain exemplary embodiments of the present invention will become more apparent from the following detailed description, taken in conjunction with the accompanying drawings, in which.

DETAILED DESCRIPTION OF EXEMPLARY EMBODIMENTS

The matters defined in the description, such as detailed constructions and elements, are provided to assist in a comprehensive understanding of the embodiments of the present invention. Accordingly, those of ordinary skill in the art will recognize that various changes and modifications of the exemplary embodiments described herein can be made without departing from the scope and spirit of the present invention. Also, descriptions of well-known functions and constructions are omitted for clarity and conciseness.

A mobile communication terminal as described herein can comprise one or more of a public switched telephone network (PSTN) terminal, a voice over Internet protocol (VoIP) terminal, a session initiation protocol (SIP) terminal, a media gateway control (Megaco) terminal, a personal digital assistant (PDA), a mobile phone, a personal communication service (PCS) phone, a hand-held personal computer (PC), a Code Division Multiple Access (CDMA)-2000 (1×, 3×) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, and the like.

Figure 1:
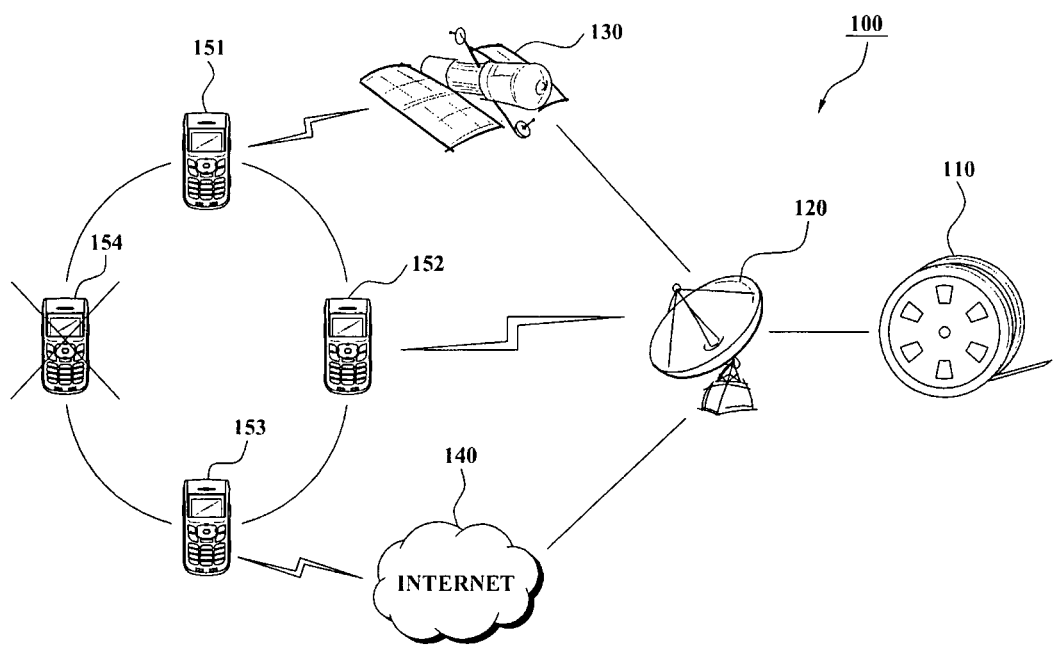
FIG. 1 is a configuration diagram illustrating a network applying a broadcast encryption algorithm according to an exemplary embodiment of the present invention.

FIG. 1 is a configuration diagram illustrating a network 100 utilizing a broadcast encryption algorithm according to an exemplary embodiment of the present invention.

As illustrated in FIG. 1, the network 100 utilizing the broadcast encryption algorithm according to an embodiment of the present invention comprises a contents provider 110, a service provider 120, a satellite 130, an Internet 140, and user terminals 151, 152, 153 and 154. The network of FIG. 1 is presented as an example only, and additional elements can be added or omitted in yet other exemplary embodiments of the present invention.

The contents provider 110 produces various contents including audio data, text data, and video data, and the service provider 120 provides the terminals 151, 152 and 153 being authorized users, with corresponding contents which have been paid for from among the various contents, via wired/wireless communications such as the satellite 130 and the Internet 140.

The service provider 120 can encrypt the corresponding contents using a broadcast encryption algorithm so that an unauthorized user 154, that is not paying for the corresponding contents, cannot use the corresponding contents.

Hereinafter, operations of generating and distributing an encryption key for the broadcast encryption will be described in greater detail by referring to FIGS. 2 through 5.

Figure 2:
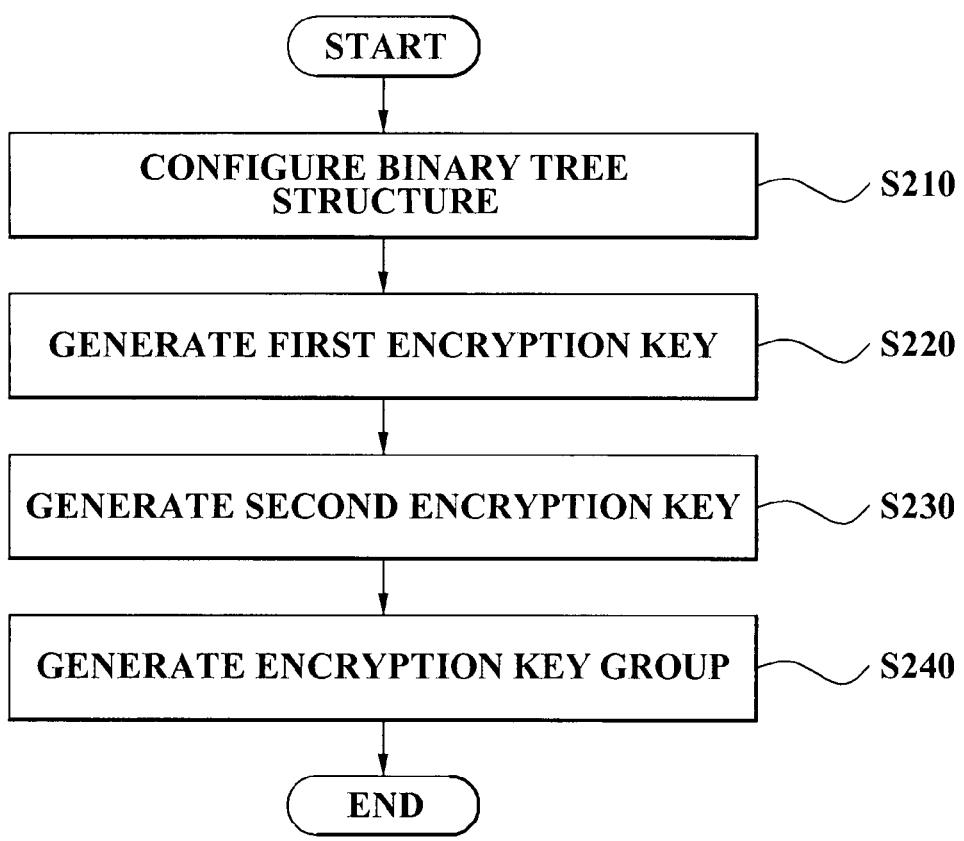
FIG. 2 is a flowchart illustrating a method of generating an encryption key for broadcast encryption according to an exemplary embodiment of the present invention.

FIG. 2 is a flowchart illustrating a method of generating an encryption key for broadcast encryption according to an exemplary embodiment of the present invention.

As illustrated in FIG. 2, the method of generating the encryption key for broadcast encryption according to an embodiment of the present invention comprises operations S210, S220, S230 and S240. Each operation is described in greater detail below.

A binary tree structure is configured in operation S210. A first encryption key is generated in operation S220, and a second encryption key is generated in operation S230. An encryption key group is then generated in operation S240.

The above method of generating the encryption key for broadcast encryption according to an embodiment of the present invention is as follows;

In operation S210, the binary tree structure is configured in a plurality of depths. In operation S220, the first encryption key is generated for all nodes, from a root node to a plurality of leaf nodes in the configured binary tree structure, that is its own key, and is generated for all of the nodes and is described in greater detail below by referring to FIG. 3.

Figure 3:
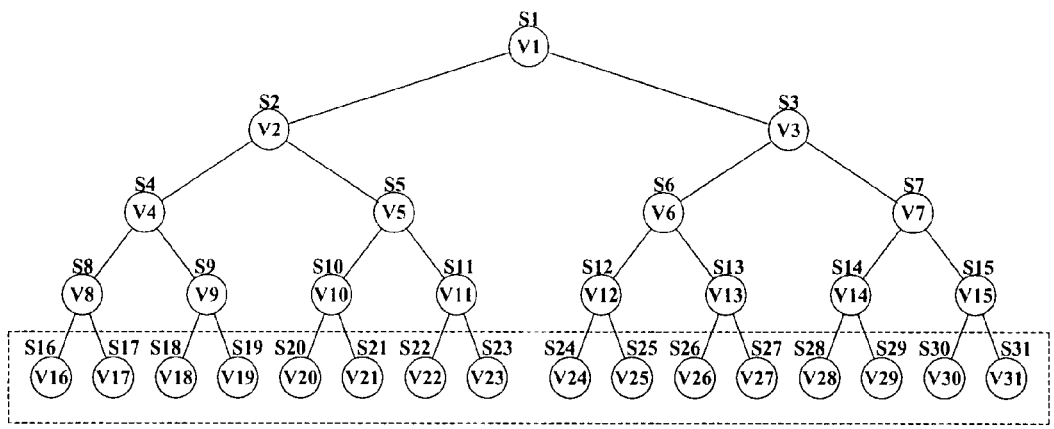
FIG. 3 is a diagram illustrating a method of generating a first encryption key for broadcast encryption according to an exemplary embodiment of the present invention.

FIG. 3 is a diagram illustrating a method of generating a first encryption key for broadcast encryption according to an exemplary embodiment of the present invention.

As illustrated in FIG. 3, the method of generating the first encryption key for broadcast encryption according to an embodiment of the present invention can allocate the first encryption key to each node from the root node to the plurality of leaf nodes in the binary tree structure. As an example, a first encryption key S1 is allocated to a root node V1, and first encryption keys S2, S3, . . . , SN can be sequentially allocated to all descendent nodes V2-V31, at each depth level.

In operation S230, a second encryption key for each intermediate node between the root node and the plurality of leaf nodes can be generated using the first encryption keys, which have been allocated to each node from the root node to the plurality of leaf nodes, and is described in greater detail below by referring to FIG. 4.

Figure 4:
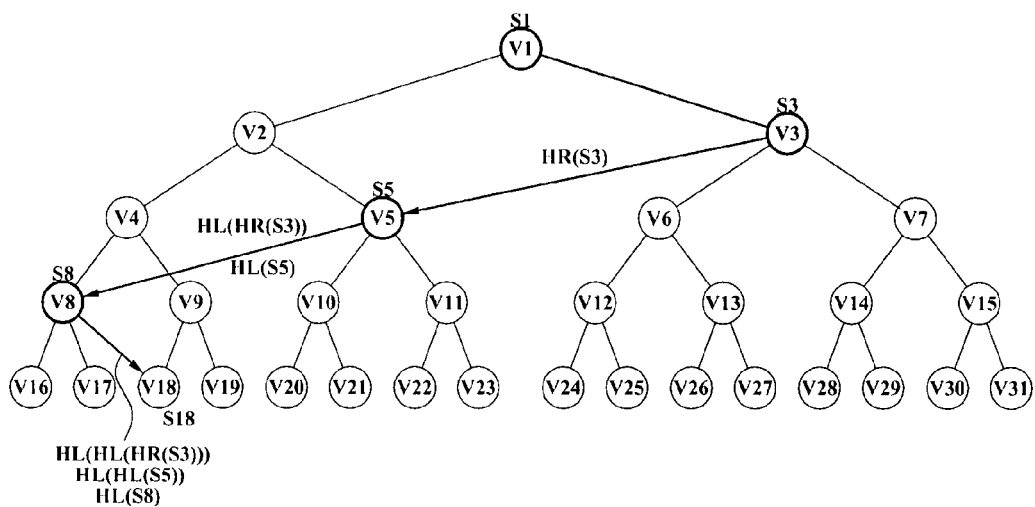
FIG. 4 is a diagram illustrating a method of generating a second encryption key for broadcast encryption according to an exemplary embodiment of the present invention.

FIG. 4 is a diagram illustrating a method of generating a second encryption key for broadcast encryption according to an exemplary embodiment of the present invention.

As illustrated in FIG. 4, the method of generating the second encryption key for broadcast encryption according to an embodiment of the present invention can allocate the second encryption key to each of child nodes, connected to a sibling node of the intermediate node, using the first encryption keys, which have been allocated to the root node V1 to a leaf node V31 in this example. Specifically, when a first child node connected to the sibling node is on a left of the sibling node, a second encryption key is generated by applying a first hash function HL(.) to a first encryption key, which is allocated to the intermediate node. When the first child node is on a right of the sibling node, a second encryption key is generated by applying a second hash function HR(.) to a first encryption key, which is allocated to the intermediate node. In this case, all types of one-way functions can be used for the hash function comprising for example, the Secure Hash Algorithm-1 (SHA-1) as a typical hash function. However, embodiments of the present invention are not limited thereto.

Hereinafter, an operation of generating a second encryption key for each node, from the root node V1 to the leaf node V18, will be described in greater detail.

Initially, a second encryption key for the leaf node V18 can be generated from a sibling node V3 of a parent node V2 of the leaf node V18, from child nodes V2 and V3 of the root node V1. Next, the second encryption key HR(S3) is generated by applying the second hash function HR(.) to the first encryption key S3, which is allocated to the sibling node V3, and the generated second encryption key HR(S3) is allocated to a child node V5 of the sibling node V2. Subsequently, the child node V5 has a first encryption key S5 and the second encryption key HR(S3).

Next, encryption keys HL(S5) and HL(HR(S3)) are generated by applying the first hash function HL(.) to the first encryption key S5 and the second encryption key HR(S3), which have been allocated to the child node V5, and the generated encryption keys HL(S5) and HL(HR(S3)) can be allocated to a child node V8 of a sibling node V4.

In this case, the child node V5 can generate the second encryption key by applying the hash function to the first encryption key S3, which is allocated to the sibling node V3, and the child node V8 can respectively allocate the encryption keys to each of the plurality of leaf nodes using a hash chain which repeatedly operates the generation of the second encryption keys by applying the hash function to the first encryption key S5 and the second encryption key HR(S3).

The second encryption keys HL(S8), HL(HL(S5)) and HL(HL(HR(S3))) are generated by applying the first hash function HL(.) to the first encryption key S8, which is allocated to the child node V8, and the second encryption keys HL(S5) and HL(HR(S3)), and the generated second encryption keys HL(S8), HL(HL(S5)) and HL(HL(HR(S3))) can be allocated to the leaf node V18, i.e. a child node of a sibling node V9. Subsequently, the leaf node V18 has encryption keys S18, HL(S8), HL(HL(S5)), HL(HL(HR(S3))).

Finally, an encryption key group including both the first encryption key and the second encryption key on a path of a user terminal, corresponding to any one of the plurality of leaf nodes, can be generated in operation S240, and is described in greater detail below by referring to FIG. 5.

Figure 5:
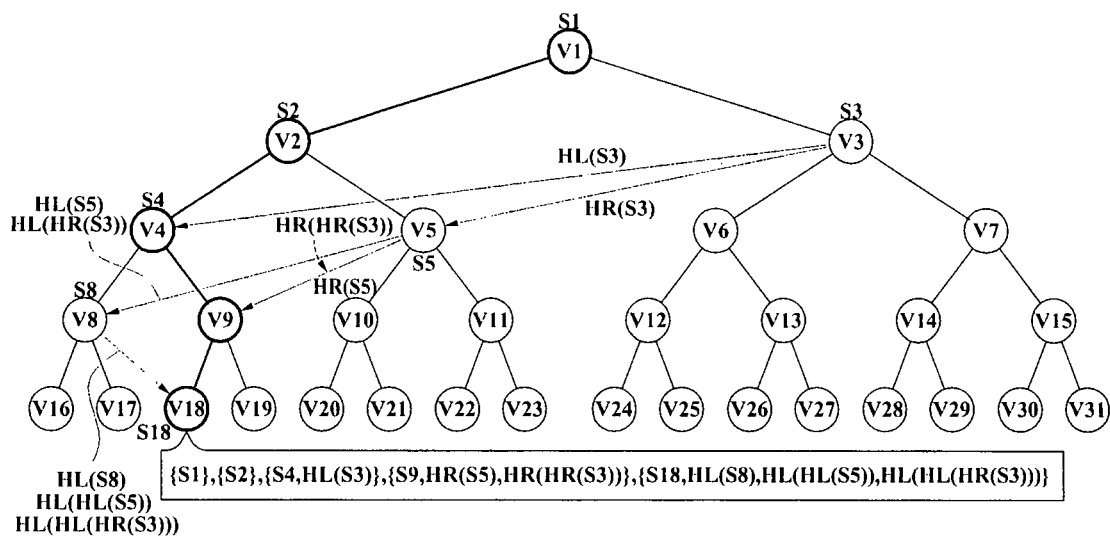
FIG. 5 is a diagram illustrating a method of generating an encryption key group for broadcast encryption according to an exemplary embodiment of the present invention.

FIG. 5 is a diagram illustrating a method of generating an encryption key group for broadcast encryption according to an exemplary embodiment of the present invention.

As illustrated in FIG. 5, the method of generating the encryption key group for broadcast encryption according to an embodiment of the present invention can generate the encryption key group which comprises the first encryption key and the second encryption key on the path of the user terminal, corresponding to the plurality of leaf nodes, from the root node to the leaf nodes. Namely, the encryption key group comprises both the first encryption key and the second encryption key, which are respectively allocated to its own parent nodes on the path, from certain leaf nodes to the root node.

Hereinafter, an operation of generating the encryption key group for the user terminal, corresponding to the leaf node V18, will be described in greater detail.

Initially, the encryption key group for the user terminal, corresponding to the leaf node V18, comprises both the first encryption key and the second encryption key, which are allocated to the plurality of parent nodes on the path, until the highest parent node V1. The plurality of parent nodes in this example include V1, V2, V4 and V9.

The highest parent node V1, i.e. the root node, has the first encryption key S1, and the parent node V2 has the first encryption key S2. The parent node V4 has the first encryption key S4 and a second encryption key HL(S3), generated from the sibling node V3 of the parent node V2, and the parent node V9 has the first encryption key S9 and second encryption keys HR(S5) and HR(HR(S3)), generated from the sibling node V5 of the parent node V4.

Consequently, the encryption key group for the user terminal, corresponding to the leaf node V18, can comprise {S1}, {S2}, {S4, HL(S3)}, {S9, HR(S5), HR(HR(S3))}, {S18, HL(S8), HL(HL(S5)) and HL(HL(HR(S3)))}, allocated from the parent nodes V1, V2, V4 and V9.

In the above described manner, an encryption key group respectively corresponding to the plurality of leaf nodes V16 through V31 of the binary tree structure can be generated to be provided to a user terminal respectively corresponding to the plurality of leaf nodes V16 through V31.

In this case, it is possible that there is an unauthorized user, that is, a user that is not paying for corresponding contents. Accordingly, the unauthorized user cannot use the corresponding contents according to an exemplary embodiment of the present invention, which is described in greater detail below by referring to FIG. 6.

Figure 6:
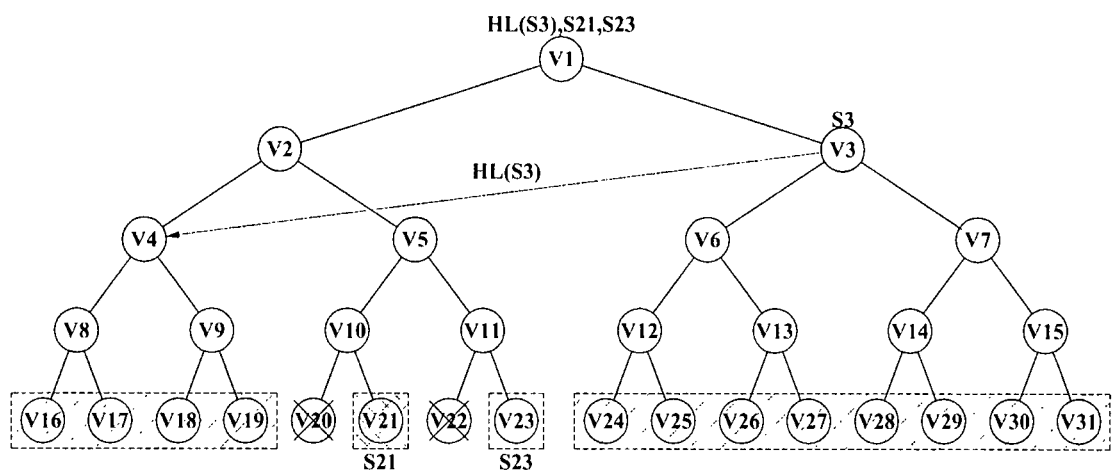
FIG. 6 is a diagram illustrating a method of selecting an encryption key for broadcast encryption according to an exemplary embodiment of the present invention.

FIG. 6 is a diagram illustrating a method of selecting an encryption key for broadcast encryption according to an exemplary embodiment of the present invention.

As illustrated in FIG. 6, the service provider 120 of FIG. 1 according to an exemplary embodiment of the present invention selects the encryption key, that is not shared by leaf nodes V20 and V22 (also referred to in this example as unauthorized users V20 and V22), to transmit the encryption key to nodes V16 through V19, V21, V23 and V24 through V31 corresponding to authorized users, when there is an unauthorized user that is not paying for the corresponding contents.

In the following description, it is assumed for illustration purposes that there are one or more unauthorized users, such as ones that are not paying for the corresponding contents.

Initially, the service provider 120 of FIG. 1 classifies the leaf nodes except for the unauthorized users V20 and V22, into three sub-groups, and the three sub-groups can comprise a first sub-group, a second sub-group, and a third sub-group. The first sub-group comprises a leaf node V21, the second sub-group comprises a leaf node V23, and the third sub-group comprises the remaining leaf nodes V116 through V19, and V24 through V31.

The service provider 120 of FIG. 1 selects an encryption key S21 to transmit to the first sub-group since the leaf node V21 shares parent nodes V1, V2, V5 and V10 of the unauthorized user V20, and selects an encryption key S23 to transmit to the second sub-group since the leaf node V23 shares parent nodes V1, V2, V5 and V11 of the unauthorized user V22.

Also, the service provider 120 of FIG. 1 selects an encryption key HL(S3), allocated to a parent node V4, to transmit to the third sub-group since the leaf nodes V16 through V19 and V24 through V31 share parent nodes V1 and V2 of the unauthorized users V20 and V22. The encryption key HL(S3) can be analyzed using an encryption key S3 since the leaf nodes V16 through V19 sharing the parent node V4 have the encryption key HL(S3), and the leaf nodes V24 through V31 sharing the parent node V3 have the encryption key S3, although the leaf nodes V24 through V31 do not have the encryption key HL(S3).

Consequently, the unauthorized users V20 and V22 cannot recover a plurality of ciphertexts, even though the transmission information is broadcast to all users since header information including the plurality of ciphertexts and invalid user terminal information are transmitted to all user terminals, since the plurality of ciphertexts having the contents and a contents key are encrypted using the selected encryption key, e.g. S21, S23 and HL(S3).

Figure 7:
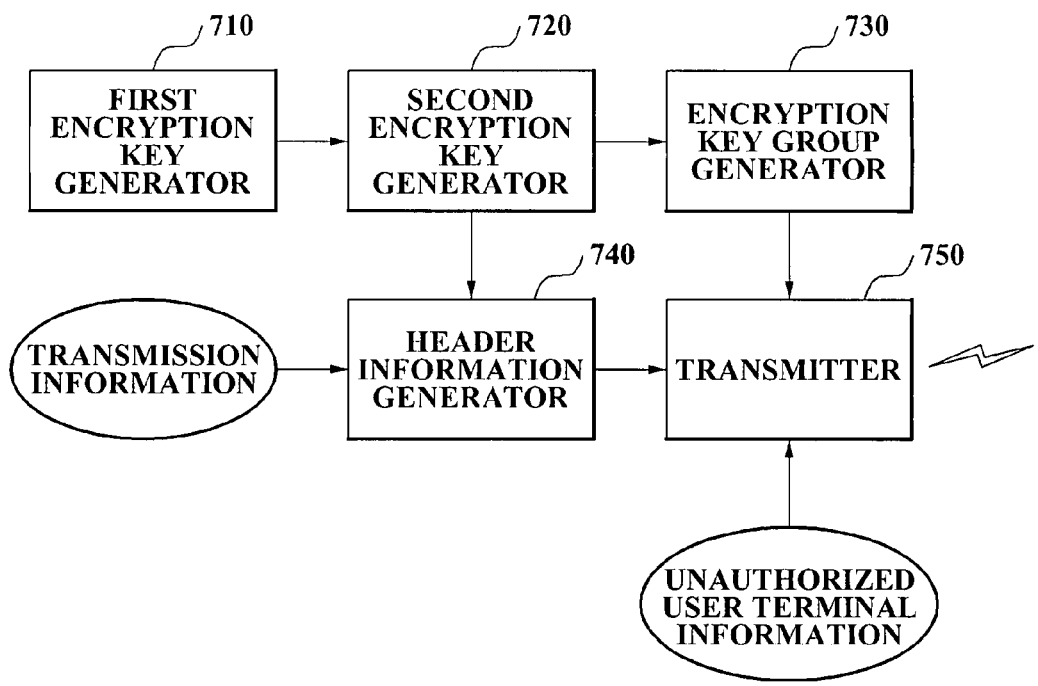
FIG. 7 is a block diagram illustrating an apparatus for generating an encryption key for broadcast encryption according to an exemplary embodiment of the present invention.

FIG. 7 is a configuration diagram illustrating an apparatus for generating an encryption key for broadcast encryption according to an exemplary embodiment of the present invention.

As illustrated in FIG. 7, the apparatus for generating the encryption key for broadcast encryption according to an exemplary embodiment of the present invention comprises a first encryption key generator 710, a second encryption key generator 720, an encryption key group generator 730, a header information generator 740, and a transmitter 750.

The first encryption key generator 710 generates a first encryption key with respect to all nodes of a tree, configured in a plurality of depths, from a root node to a plurality of leaf nodes. The second encryption key generator 720 generates a second encryption key with respect to each intermediate node between the root node and the plurality of leaf nodes.

The second encryption key generator 720 generates any one of first and second keys using the first encryption key depending on whether a first child node, connected to a sibling node of the intermediate node, is on a left path or a right path of the intermediate node. Also, the second encryption key generator 720 generates any one of third and fourth keys using the first encryption key and any one of the generated first and second keys depending on whether a second child node, connected to a sibling node of the first child node, is on a left path or a right path of the first child node.

The encryption key group generator 730 can provide a plurality of user terminals with an encryption key group via the transmitter 750 by generating the encryption key group including both the first encryption key and the second encryption key on a path of a user terminal, corresponding to any one node from the root node to the leaf nodes.

The header information generator 740 can generate header information including a plurality of ciphertexts by generating the plurality of ciphertexts, which have respectively encrypted transmission information to be shared using the first and second encryption keys, according to the unauthorized user terminal information. The transmitter 750 can transmit the generated header information and the unauthorized user terminal information to all of the user terminals.

Each of the user terminals receives the header information and the unauthorized user terminal information, and calculates a corresponding encryption key according to the received unauthorized user terminal information. Accordingly, each of the user terminals can search for a ciphertext, which has been encrypted using the calculated encryption keys, among the plurality of ciphertexts included in the header information, and recover the transmission information.

The method of generating the encryption key for broadcast encryption according to the above-described exemplary embodiments of the present invention can be recorded in computer-readable media including program instructions to implement various operations embodied by a computer. The media may also include, alone or in combination with the program instructions, data files, data structures, and the like. Examples of computer-readable media include but are not limited to magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as those produced by a compiler, and files containing higher level code that may be executed by the computer using an interpreter. The described hardware devices may be configured to act as one or more software modules in order to perform operations of the above-described exemplary embodiments of the present invention.

As described above, the method and apparatus of generating the encryption key for broadcast encryption, according to the exemplary embodiments of the present invention, can generate encryption keys for broadcast encryption since a first encryption key for each node, from a root node to a plurality of leaf nodes, is generated and a second encryption key for a child node, connected to a sibling node of an intermediate node, is generated using the generated first encryption key.

While the present invention has been shown and described with reference to certain exemplary embodiments thereof, it will be understood by those skilled in the art that various changes in form and detail may be made therein without departing from the spirit and scope of the invention as defined by the appended claims and their equivalents.

What is claimed is:

1. A method, using a hardware processor, for generating an encryption key for broadcast encryption, the method comprising:
generating, by the hardware processor, a first encryption key with respect to all nodes, configured in a plurality of depths, from a root node to a plurality of leaf nodes; and
generating, by the hardware processor, a second encryption key for a first child node connected to a sibling node of an intermediate node between the root node and the plurality of leaf nodes, wherein:
the generating of the second encryption key comprises generating any one of first and second keys using the first encryption key of the intermediate node depending on whether the first child node, connected to a sibling node of the intermediate node, is on a left path or a right path of the sibling node,
the generating of the second encryption key comprises generating a corresponding encryption key in a hash chain type using at least any one of the first and second encryption keys, the second encryption key being generated by applying a first hash function HL(.),
the second encryption key is generated by a hash of the first encryption key belonging to the intermediate node, and
the sibling node cannot determine the second encryption key of the first child node.

2. The method of claim 1, further comprising generating any one of third and fourth keys using the first encryption key of the first child node and any one of the generated first and second keys depending on whether a second child node, which is a child node of a sibling node of the first child node, is on a left path or a right path of the sibling node of the first child node.

3. The method of claim 1, wherein the generating of the second encryption key comprises generating a single first encryption key and 'N−1' pieces of the second encryption key for each node, included in each depth, when a depth is 'N' from the root node.

4. The method of claim 1, further comprising:
generating an encryption key group comprising both the first encryption key and the second encryption key on a path of a user terminal, corresponding to any one node from the root node to the leaf nodes.

5. The method of claim 1, further comprising:
generating header information, comprising a plurality of ciphertexts which have encrypted transmission information using the first and second encryption keys according to unauthorized user terminal information, when there is an unauthorized user terminal corresponding to any one of the leaf nodes,
wherein the generated header information and the unauthorized user terminal information are transmitted to all user terminals, corresponding to the plurality of leaf nodes.

6. The method of claim 5, further comprising controlling a user terminal to:
calculate an encryption key according to the unauthorized user terminal information after the user terminal receives the header information and the unauthorized user terminal information; and recover the transmission information by searching for a ciphertext which has been encrypted using the calculated encryption key, from the plurality of ciphertexts included in the header information.

7. The method of claim 1, wherein the intermediate node can determine the second encryption key of the first child node.

8. The method of claim 1, wherein the leaf nodes have second encryption keys comprising a hash chain.

9. The method of claim 1, wherein the second encryption key generated for the first child node is based upon a hash encryption of the intermediate node's first encryption key.

* * * * *